(12) United States Patent
Platt

(10) Patent No.: US 7,235,893 B2
(45) Date of Patent: Jun. 26, 2007

(54) REDUCED FRICTION WIND TURBINE APPARATUS AND METHOD

(76) Inventor: Michael D. Platt, 2034 Knox Rd. 700N, Yates City, IL (US) 61572

(*) Notice: Subject to any disclaimer, the term of this patent is extended or adjusted under 35 U.S.C. 154(b) by 91 days.

(21) Appl. No.: 11/105,945

(22) Filed: Apr. 14, 2005

(65) Prior Publication Data
US 2006/0232076 A1    Oct. 19, 2006

(51) Int. Cl.
*F03D 3/04* (2006.01)
(52) U.S. Cl. .................... 290/54; 290/43; 290/44; 290/55
(58) Field of Classification Search .............. 290/42, 290/43, 44, 52, 53, 54, 55; 416/17, 108, 416/112, 119
See application file for complete search history.

(56) References Cited

U.S. PATENT DOCUMENTS

| 852,022 | A |   | 4/1907  | Kirschweng |             |
|---------|---|---|---------|------------|-------------|
| 891,671 | A |   | 6/1908  | Coon       |             |
| 4,012,163 | A | * | 3/1977 | Baumgartner et al. | 415/208.3 |
| 4,031,405 | A | * | 6/1977 | Asperger   | 290/55      |
| 4,143,990 | A |   | 3/1979  | Atencio    | 405/78      |
| 4,218,184 | A | * | 8/1980 | McPherson et al. | 416/17 |
| 4,301,377 | A |   | 11/1981 | Rydz       | 290/43      |
| 4,474,529 | A | * | 10/1984 | Kinsey    | 415/4.2     |
| 5,038,049 | A | * | 8/1991 | Kato       | 290/55      |
| 5,133,637 | A | * | 7/1992 | Wadsworth  | 415/4.4     |
| 5,451,137 | A |   | 9/1995  | Gorlov     | 415/7       |
| 6,160,336 | A | * | 12/2000 | Baker et al. | 310/74   |
| 6,210,113 | B1 |  | 4/2001  | Ihrenberger | 416/116    |
| 6,294,844 | B1 | * | 9/2001 | Lagerwey   | 290/55      |
| 6,448,669 | B1 | * | 9/2002 | Elder      | 290/54      |
| 6,616,403 | B1 |  | 9/2003  | Smith et al. | 415/3.1   |
| 6,840,738 | B1 | * | 1/2005 | Swanberg   | 416/17      |
| 6,984,899 | B1 | * | 1/2006 | Rice       | 290/44      |

* cited by examiner

*Primary Examiner*—Nicholas Ponomarenko
(74) *Attorney, Agent, or Firm*—Husch & Eppenberger LLC; Robert C. Haldiman

(57) ABSTRACT

The present invention is a wind power apparatus for driving an electric generator. The wind power apparatus comprises a frame, a vertical axle mounted on the frame and a buoyant hull. The buoyant hull is rotational disposed on the axle. The buoyant hull has a curvilinear side surface. The wind power apparatus further comprises a fan. The fan is mounted on the buoyant hull such that wind rotating the fan rotates the buoyant hull. The wind power apparatus further has a drive wheel. The drive wheel is disposed in close cooperation with the curvilinear of the surface of the buoyant hull such that rotation of the buoyant hull rotates the drive wheel. The drive wheel is adapted to be in driving engagement with an electric generator such that rotation of the drive wheel turns the electric generator to generate electricity.

21 Claims, 4 Drawing Sheets

REDUCED FRICTION WIND TURBINE APPARATUS AND METHOD

CROSS-REFERENCE TO RELATED APPLICATIONS

None.

BACKGROUND OF THE INVENTION

1. Field of the Invention

The present invention is in the field of wind driven electricity generation.

2. Related Art

Wind as an alternate motive force for generating electricity has long provided an attractive alternative to conventional power generation techniques. The art has been limited by at least two technical difficulties. One is the inconsistency of the wind. Stated alternatively, there is a need in the art for extending the ability of wind driven electricity generation equipment to generate electricity beyond the time when the wind has dropped below velocities sufficient to turn generators. A corollary to this problem is overcoming the frictional resistance to supporting equipment that is large and massive enough to drive larger generating turbines.

Both of the long standing needs have a common denominator; that is the increased friction resistance inherent in using larger equipment capable of driving larger generators and also inherent with incorporating fly wheels for extended generation times. There is a need in the art for a wind driven electricity generating turbine having reduced friction support for its moving parts.

Separately, there is a need for a wind driven electricity generator that is not so structurally high, obtrusive and having such long blades that it interferes with bird life. Present windmills have long arms stationed atop towers that are tall enough to encroach upon the flight paths of birds and consequentially kill a number of them.

There is a continuing need in the electricity generating art for increasing durability and increasing economy such that electricity may be generated at a reduced cost.

SUMMARY OF THE INVENTION

The present invention is a wind driven apparatus engaging one or more electrical generators for generating electricity. The wind driven component is maintained in frictionless suspension by floating it on a pool of water. The invention may further comprise a flywheel in order to continue mechanical turning of generators after wind speed is insufficient to turn the fan is no longer available.

The invention may further comprise a cowling for cutting wind resistance on an drag side of a fan. The cowling may further incorporate a wind vane and a rotational mounting so that the cowling always presents an open face of a fan to the windward direction and also continually shields the drag face of the fan from the wind to reduce drag.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
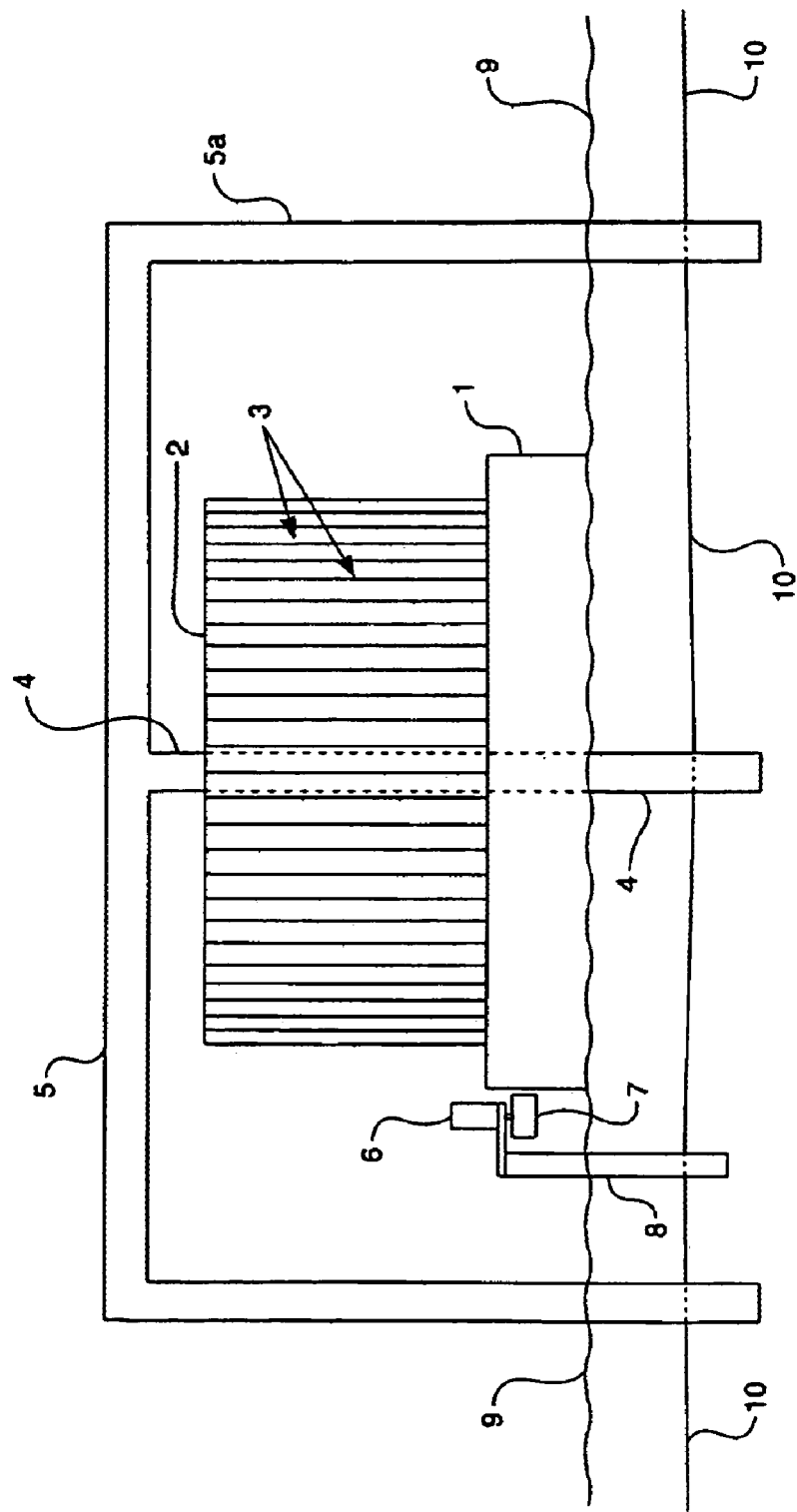
FIG. 1 is a side view of the wind driven fan and electric generator of the present invention.
Figure 2:
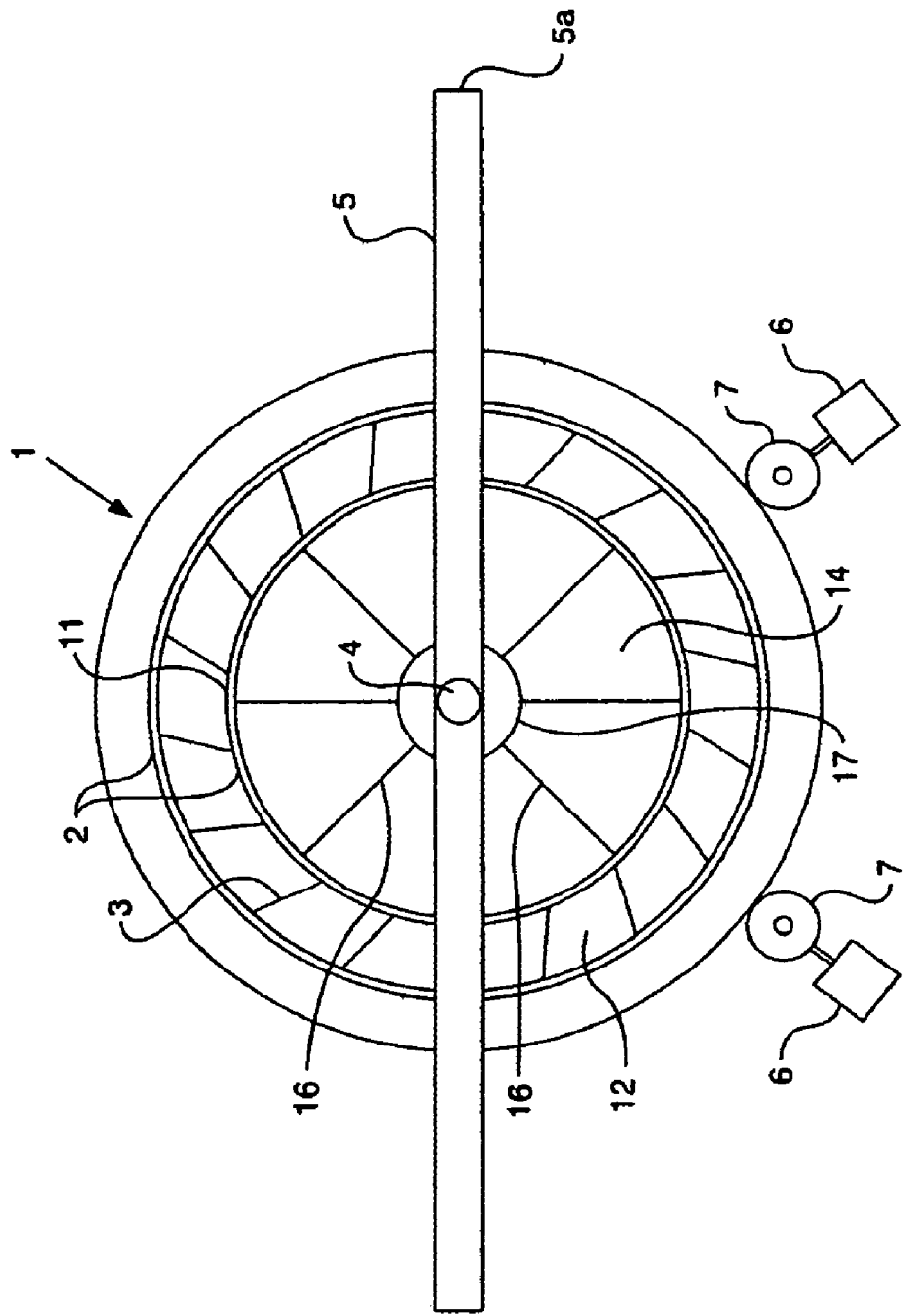
FIG. 2 is a top view of the wind driven fan and electric generator of the present invention.

As illustrated in the drawings where like numerals represent like elements, FIGS. 1 and 2 depict the first embodiment of the present invention. A floating hull 1 is disposed to rest on a body of water 9. The body of water may be a preexisting naturally formed body water. Alternatively, the body of water 9 may be an artificially created pond, lagoon or the like disposed for support of the wind driven electricity generator.

Hull 1 has a positive displacement so that it floats on water. Hull 1 may be any size and weight, subject only to the limitation that it floats. Accordingly, hull 1 may be heavy and massive enough to serve as a flywheel. In the depicted embodiment, hull 1 is circular.

Hull 1 serves as a bottom mount for a plurality of vanes 3. The vanes are circularly arranged to form a fan. The type of fan 3 depicted is sometimes referred to in the art as "squirrel cage." The top of the vanes 3 are secured by an inner annular frame 2 and an outer annular frame 2 as is apparent on FIG. 2, the vanes 3 are disposed at an angle to the radius of the circular squirrel cage. They may thereby catch the wind and propel the fan angularly. The vanes may be any angle and any spacing. The structural integrity of the squirrel cage is further supported by spokes 16.

The squirrel cage 3 and hull 1 are mounted on a frame 5. The frame 5 has descending substantially vertical lateral portions 5A for mounting in the ground 10 or other fixed surface. From the cross member of frame 5 descends a substantially vertical axle 4. Axle 4 is secured to frame 5 by a bearing. Axle 4 is mounted in the ground having a mount that may also include a bearing.

Located on one side of the hull 1 is a support frame or rod 8. At the top of the support frame or rod is an electrical generator 6. The electrical generator 6 may have an axle extending therefrom on which is placed a frictional contact roller 7. The post 8, generator 6 and drive roller 7 are disposed such that the driver roller 7 may be in contact with the outer circular edge of hull 1. As seen in FIG. 2, there may be multiple generators.

In operation, wind contacts the plurality of vanes of 3 and drives the squirrel cage rotationally around vertical axle 4. The rotating squirrel cage turns the circular hull 1 and, through frictional engagement, turns the contacting drive wheels 7. The drive wheel 7 turn the armature of the generator 6, thereby generating electricity through known methods. Generated electricity may be conveyed away from the device via wires (not shown). Multiple generators may be driven.

In an alternative embodiment of the present invention, vertical axle 4 may be mounted on its top bearing and its bottom mount with some "play" therein. Such a mounting would allow absorption of gusts of wind without creating frictional drag on the rotation of the squirrel cage and hull. In order to do so the mounting and generator 6 on post 8 would have a flexing mechanism or spring in order to hold drive wheel 7 in contact with the outer circular edge of hull 1.

Figure 3:
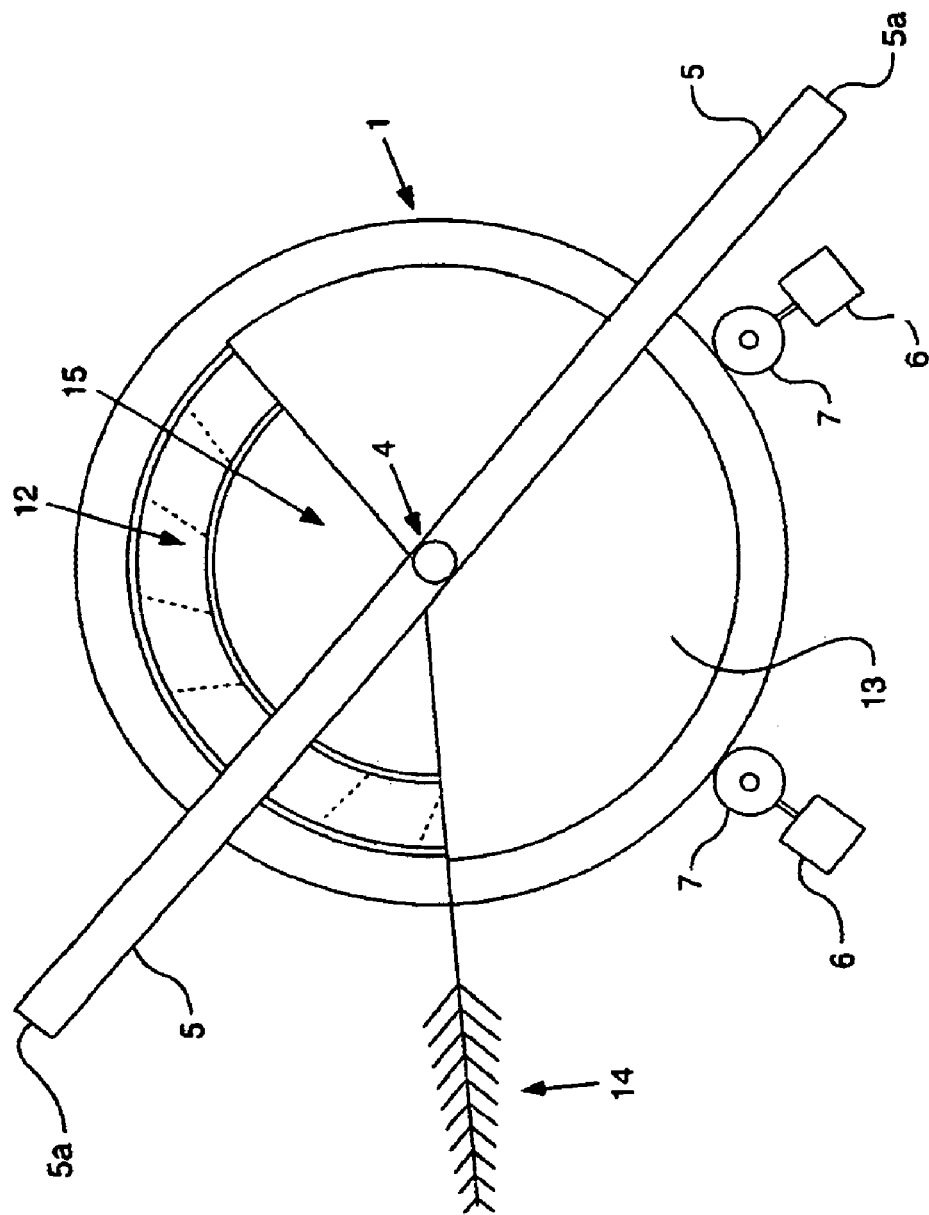
FIG. 3 is a top view of the wind driven fan and electric generator of the present invention with cowling and wind vane attached.
Figure 4:
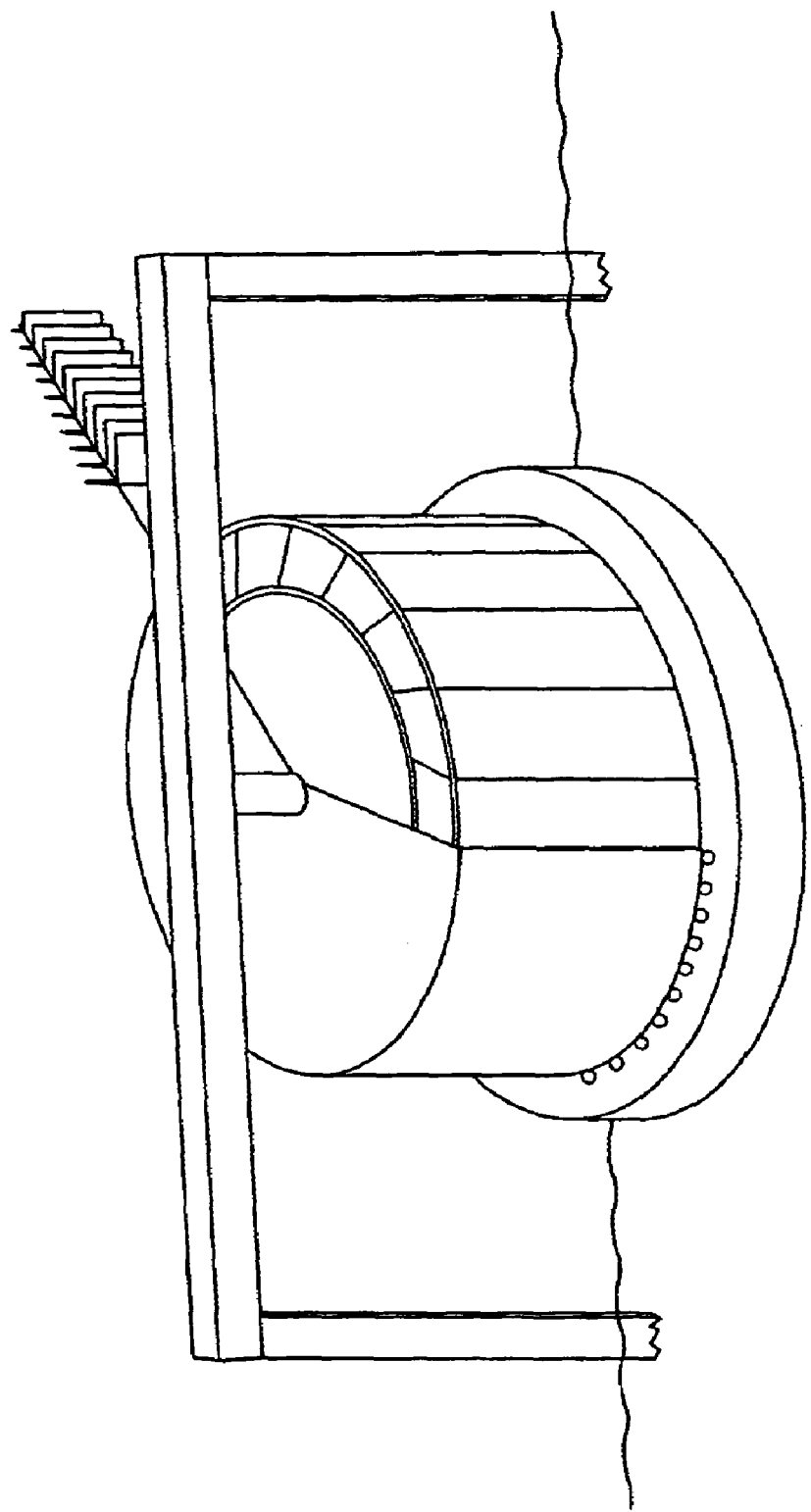
FIG. 4 is perspective view of the wind driven fan and electric generator of the present invention with cowing and wind vane attached.

In FIGS. 3 and 4 are depicted another alternative embodiment of the present invention. This embodiment includes a cowling 13 and wind vane 14. The cowling 13 presents a face to the wind that reduces drag on the side of the squirrel cage opposite the wind driven side. Accordingly, there is a positive balance of forces for the continuing drive of the squirrel cage by the wind, for an increased amount of angular rotation in a constant wind and for adequate driven angular rotation in lower wind speeds.

Wind vane 14 serves to properly and consistently orient the cowling towards the wind. As can be seen, the angular section of the squirrel cage having the maximum capacity to transfer driving wind to angular momentum is kept exposed to the wind through the opening in the cowling. Concomitantly, the opposing half of the squirrel cage, which would create a drag on the conversion of wind to angular momentum, is shielded to reduce drag on it. The cowling 13 is mounted on vertical axle 4 with another bearing at its top. The cowling 13 may also be provided with bottom rollers or other types of bearings and may alternatively engage a groove or other reduced friction surface on the top of hull 1 such that it may turn freely.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A wind power apparatus for driving an electric generator comprising:
   a frame mounted in the ground with a portion of said frame extending above water;
   a substantially vertical axle mounted on said frame portion extending above the water;
   a buoyant hull, said buoyant bull being rotationally disposed on said axle and said buoyant hull having a substantially cylindrical side surface;
   a fan, said fan being mounted on said buoyant hull such that a wind rotating said fan rotates said buoyant hull;
   a drive wheel and a generator assembly, said drive wheel being disposed in close cooperation with said substantially cylindrical side surface of said buoyant hull such that rotation of said buoyant hull rotates said drive wheel, and said drive wheel being adapted to be in driving engagement with an electric generator such that rotation of said drive wheel turns said electric generator to generate electricity.

2. The apparatus of claim 1 wherein said curvilinear side surface is circular.

3. The apparatus of claim 1 wherein said fan is a squirrel cage.

4. The apparatus of claim 1 wherein said fan is fixedly attached to said buoyant hull.

5. The apparatus of claim 1 wherein said fan and said buoyant hull are coaxial.

6. The apparatus of claim 1 further comprising a cowling, said cowling being in operative engagement with said fan such that a driven face of said fan is open to windward, and a drag face of said fan is shielded from the wind.

7. The apparatus of claim 6 wherein said cowling is cylindrical, said cylindrical cowling being at least about 180 degrees.

8. The apparatus of claim 6 wherein said cowling has a top.

9. The apparatus of claim 7 wherein said cowling is rotationally mounted on said vertical axle.

10. The apparatus of claim 6 further comprising a wind vane fixedly attached to said cylinder, said wind vane being disposed to orient said cowling to windward.

11. The apparatus of claim 6 further comprising rollers on a bottom edge of said cowling, said rollers being disposed to roll on a top surface of said buoyant hull.

12. The apparatus of claim 1 wherein a radius of said buoyant hull is substantially at least as wide as a radius of said fan.

13. The apparatus of claim 1 wherein said engagement of said drive wheel with said buoyant hull is substantially the same or a greater distance from the vertical axis as an outer portion of said fan.

14. The apparatus of claim 1 wherein said buoyant hull acts as a fly wheel.

15. The apparatus of claim 1 further comprising at least one other drive wheel.

16. The apparatus of claim 15 wherein said drive wheels are substantially co-planar.

17. The apparatus of claim 1 wherein said drive wheel is co-planar with said hull.

18. The apparatus of claim 1 wherein said axle has a lower portion mounted in the ground.

19. The apparatus of claim 1 wherein said axle is mounted on at least one of said frame or in the ground with at least one bearing.

20. The apparatus of claim 1 wherein said drive wheel and generator assembly includes a flexing linkage disposed to keep said drive wheel in driven contact with said side surface of said buoyant hull.

21. The apparatus of claim 1 wherein said drive wheel and said generator assembly are mounted on said frame.

* * * * *